Jan. 30, 1968
C. F. BEELER
3,366,165
AIR CONDITIONING SYSTEM
Filed Oct. 19, 1966
4 Sheets-Sheet 1
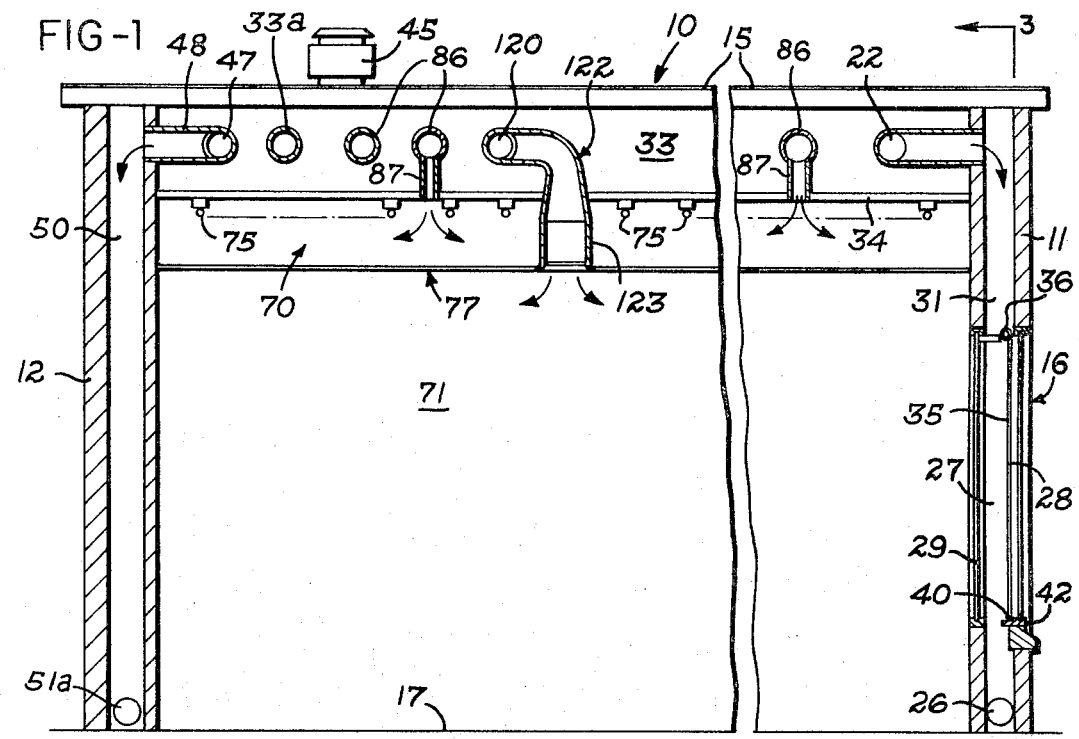
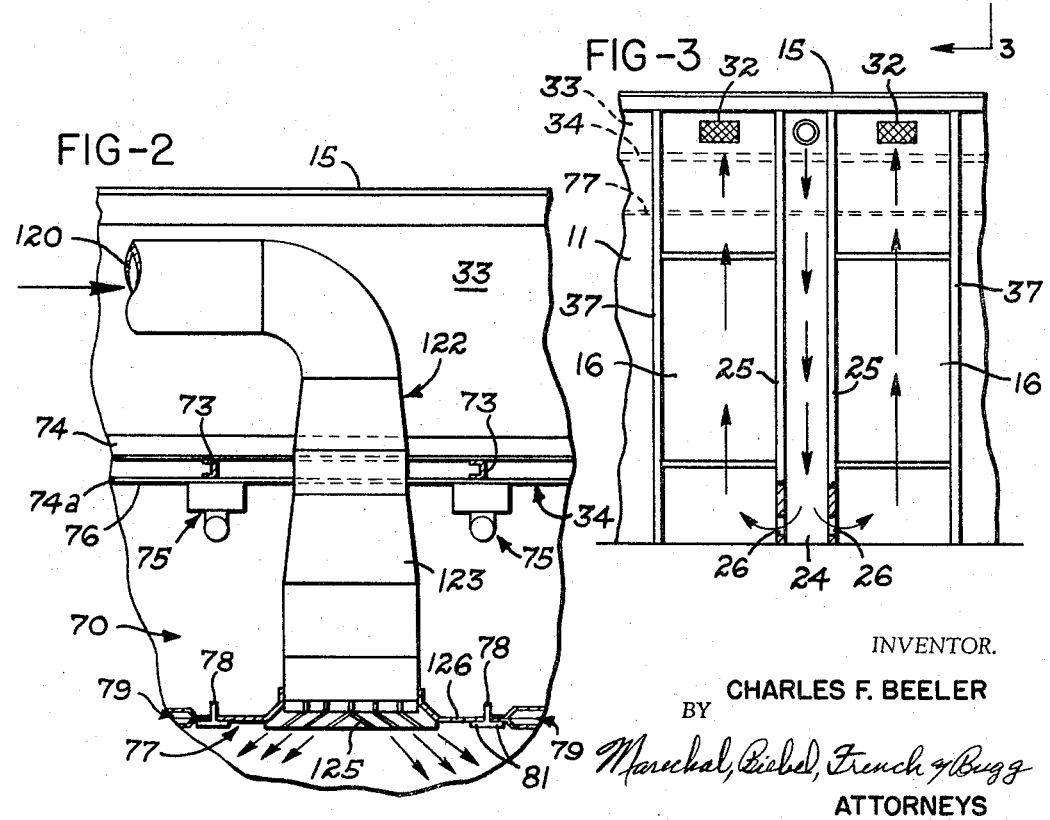
INVENTOR.
CHARLES F. BEELER
BY Marechal, Biebel, French & Bugg
ATTORNEYS

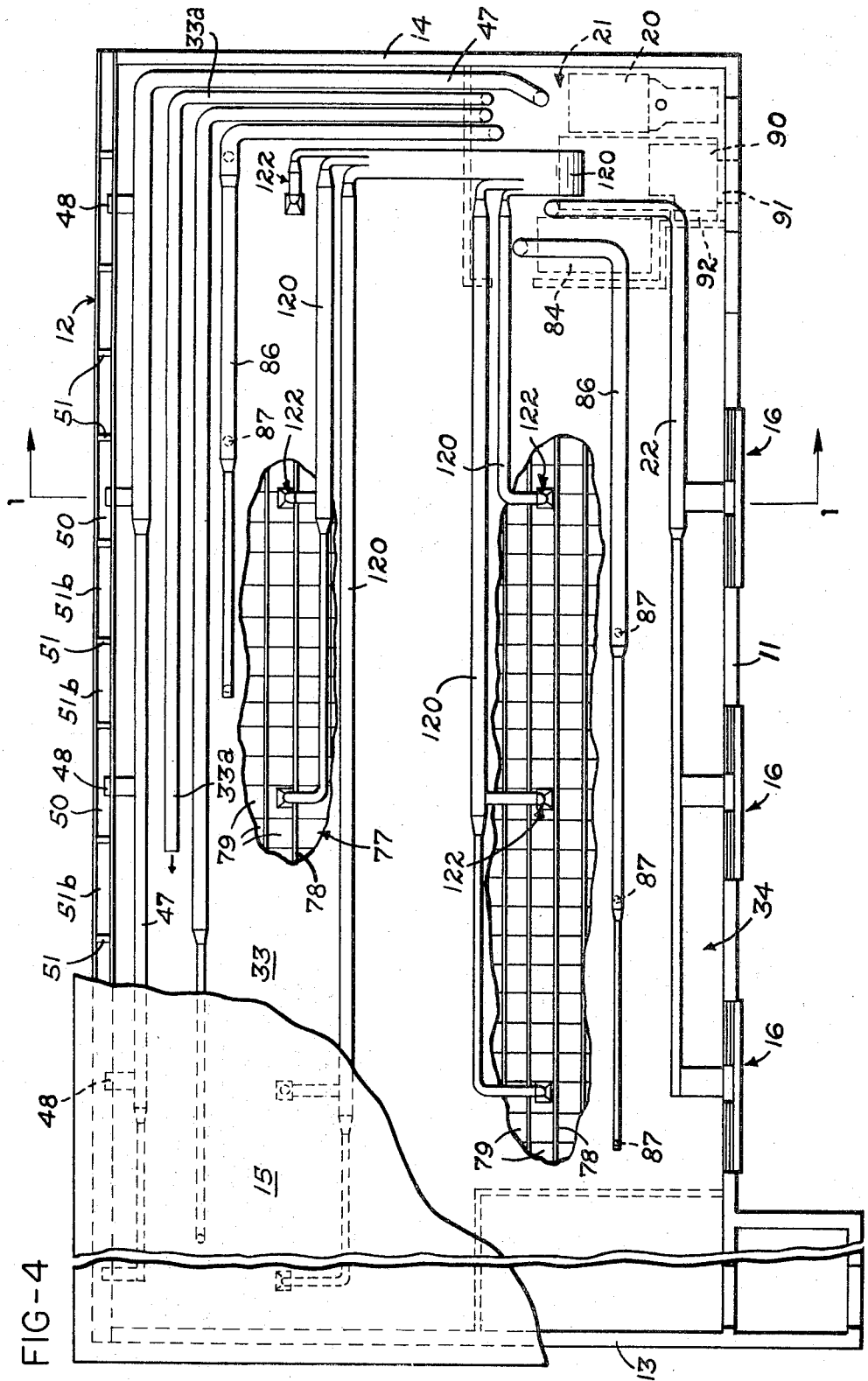

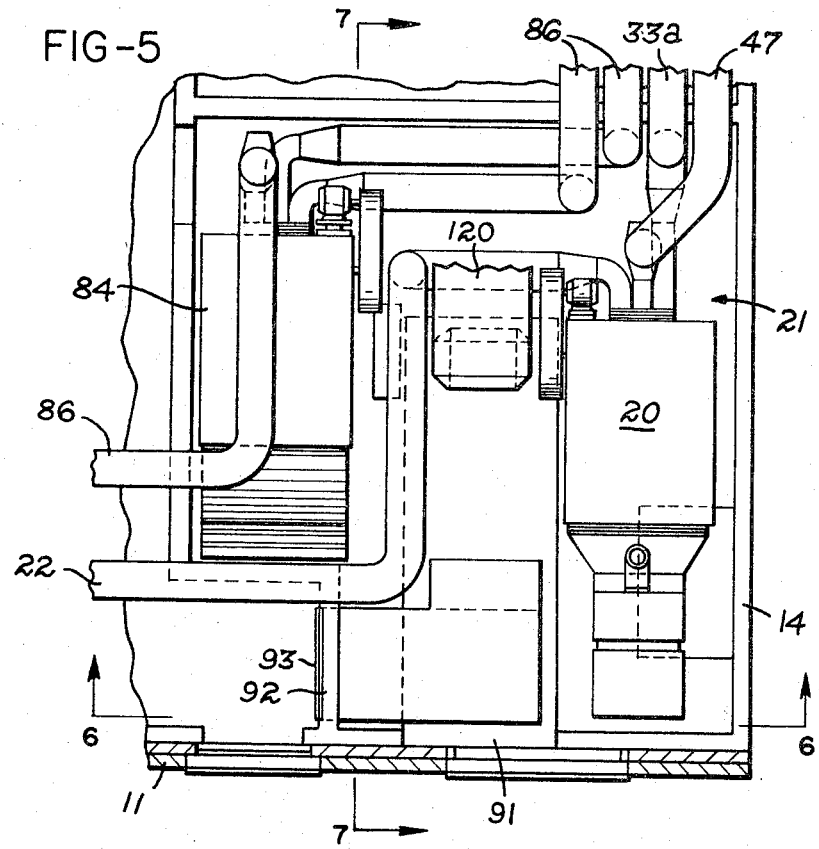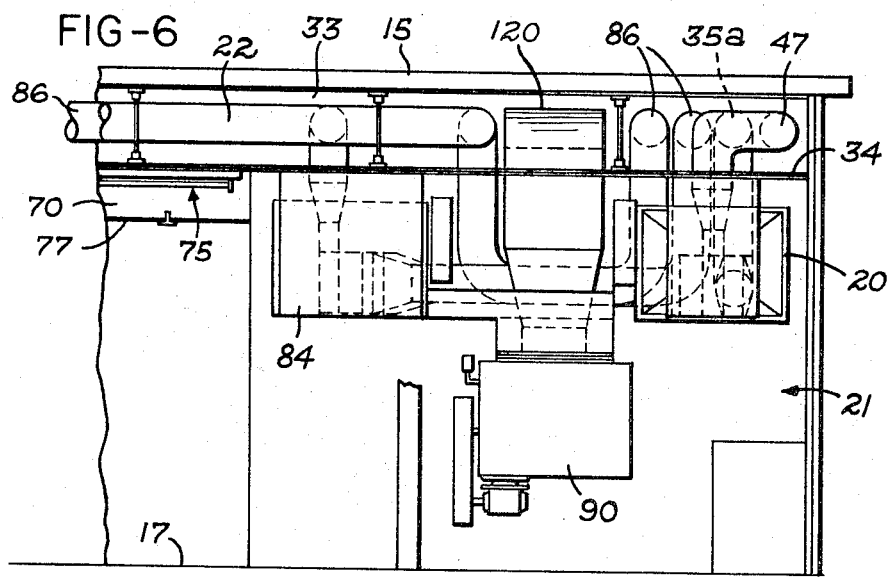

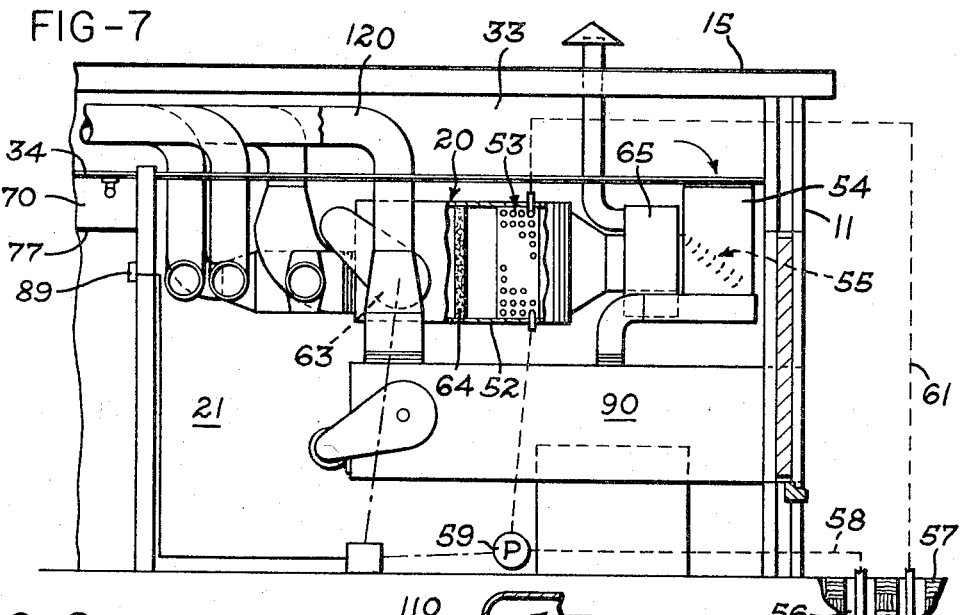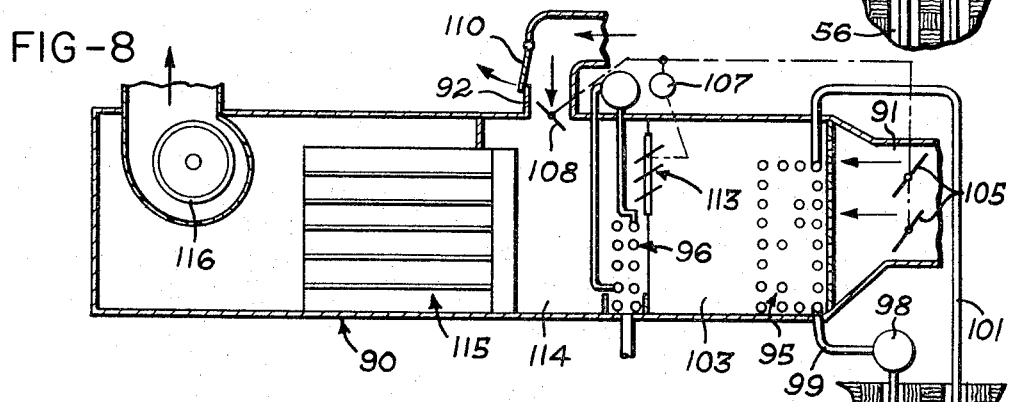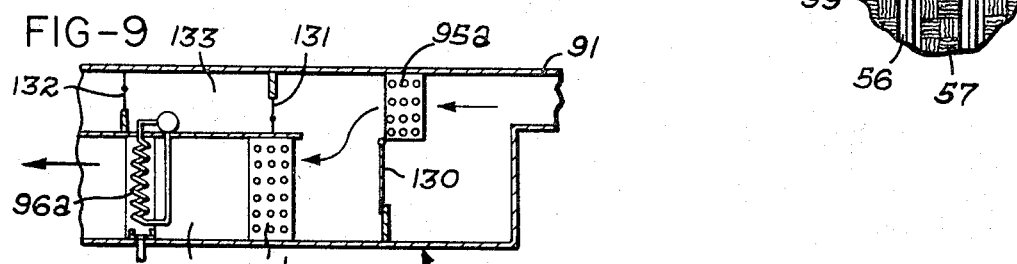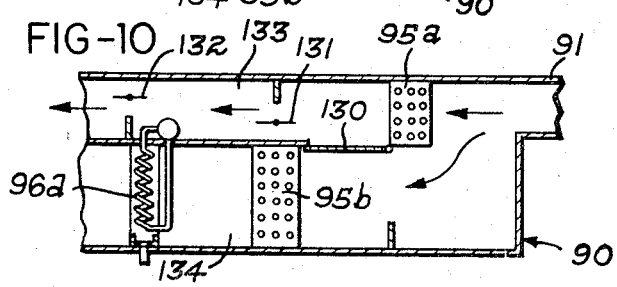

United States Patent Office 3,366,165
Patented Jan. 30, 1968

3,366,165
AIR CONDITIONING SYSTEM
Charles F. Beeler, c/o Automated Environment, Inc.,
Box 896, Hamilton, Ohio 45012
Continuation-in-part of application Ser. No. 531,973,
Mar. 4, 1966. This application Oct. 19, 1966, Ser.
No. 587,828
9 Claims. (Cl. 165—22)

ABSTRACT OF THE DISCLOSURE

An air conditioning system for a building in which human beings will occupy an interior space. The system has three completely separate sub-systems including a perimeter sub-system for compensating for the flow of heat through the walls and windows of the building, a light system for controlling the heat produced by the lights, and an interior system for supplying air at a constant temperature and volume to the interior space. The interior is heated by the lights so that, by controlling the temperature of the air in the light system, the heating effect can be varied as required to maintain the desired temperature in the interior space.

---

This application is a continuation-in-part of my copending application Ser. No. 531,973, filed Mar. 4, 1966, now Patent No. 3,288,206, granted Nov. 29, 1966.

This invention relates to an air conditioning system wherein the air within a structure is carefully and automatically controlled to provide optimum temperature, humidity, and circulation, while operating at maximum efficiency at all times.

In particular, this invention relates to an air conditioning system wherein separate systems are provided to compensate for the heat load passing through the walls of the structure, for the heat generated internally by the lights in the structure, and for the heat and moisture produced by the people occupying the structure. In this manner, the system performs most efficiently since it is not necessary to provide fresh humidified controlled air in the first two of these systems.

Accordingly, an important object of this invention is to provide an air conditioning system with separate interrelated subsystems for negating the heat load through the walls of the structure, for controlling the effects of heat generated by the lighting fixture, and for regulating the temperature and humidity of the air within the structure.

Another object of this invention is to provide an air conditioning system of the aforesaid type wherein the system which compensates for the heat generated by the lights is carefully controlled so that the heat load created by the lights can also be used to heat the interior of the structure thus providing the only source of heat required to balance the heat of people and visible light, versus cooling of the ventilating air.

A further object of this invention is to provide an improved heat exchanger unit wherein the cooling and dehumidification stages are separate and a bypass is provided so that the dehumidification stage can be eliminated during periods of dry weather.

Another object of this invention is to provide an air conditioning system of the aforesaid type wherein separate heat exchange units are used for each of the three subsystems and wherein inexpensive well water is used to provide air at the temperature required to balance the load of each subsystem.

Another object of the invention is to provide an air conditioning system which is relatively simple in design for maximum efficiency and dependability, and further to provide such a system which is much cheaper to operate than systems presently in use, and is automatic so that it does not require experienced human judgment for efficient operation.

These and other objects of the invention will be apparent from the following description, the accompanying drawings and the appended claims.

In the drawings:

FIG. 1 illustrates a cross-section of a building utilizing the air conditioning system in accordance with the invention and taken substantially along the line 1—1 of FIG. 4;

FIG. 2 is an enlarged sectional view through the ceiling structure showing the ceiling and light plenums;

FIG. 3 is a sectional view taken along the line 3—3 of FIG. 1;

FIG. 4 is a plan view of the building with portions of the roof and ceiling removed to illustrate the various components thereof;

FIG. 5 is a plan view of the heat exchangers used in the system;

FIG. 6 is a sectional view taken along the line 6—6 of FIG. 5;

FIG. 7 is another sectional view taken along the line 7—7 of FIG. 6;

FIG. 8 is a sectional view taken centrally through the heat exchanger of the interior air conditioning system;

FIG. 9 is a schematic view showing the flow path through the interior heat exchanger in its dehumidification set-up; and FIG. 10 is a view similar to FIG. 9 but showing the heat exchanger having straight through flow.

Referring to the drawings wherein a preferred embodiment of the invention is shown, FIG. 1 shows a typical building 10 in which the air conditioning system in accordance with the invention is installed. In particular, the building 10 includes the vertical side walls 11, 12, 13 and 14 (FIG. 4) having the roof 15 supported thereby and having one or more windows 16 mounted in the side wall 11. The walls 13 and 14 are interior walls and there is consequently little or no heat transfer therethrough.

The exterior side walls 11 and 12 of the building 10 are well insulated so that there is negligible heat flow therethrough, and there similarly will be only a negligible amount of heat flow into the structure through the floor 17 thereof. In conventional structures, the temperature of the outside air has substantial effect on the temperature of the air within the structure primarily because of heat flow through the windows 16, walls 11 and 12, and roof 15.

This invention provides three separate systems for conditioning the air within the structure so that maximum efficiency is achieved. The system thus includes the perimeter system for controlling the flow of heat through the walls and roof of the building, the light system for controlling the heating of the interior of the building, and the interior system for supplying properly treated air for contact with the people using the building.

Perimeter system

The perimeter system includes a heat exchanger-blower unit 20 mounted in the equipment room 21 (FIG. 4) or other convenient location within the building 10. The unit 20 is connected by the duct 22 to the cavities 24 created between the studs 25 between each of the pairs of windows 16 so that the air passes downwardly between the windows (FIG. 3), then through the openings 26 below the windows and into the space 27 between the parallel panes 28 and 29 of glass of each of the windows. Thus the air flows upwardly through the interior of the windows into the upper chamber 31 above the window and then passes through the openings 32 to the joist plenum 33 created between the roof 15 and the subceiling 34 (FIG. 1). The joist plenum thus acts as a collector chamber since all of the air from the ducts 22 flows through the windows and into this space.

By moving a sufficiently large amount of air through this system, the air in the joist plenum 33 also acts to prevent the flow of heat through the roof 15 as does the plenum supply 33a (FIG. 4) which leads from the unit 20. The inlet of the heat exchanger unit 20 receives air only from the joist plenum 33 so that this perimeter system is substantially a closed system, and this is possible since the air in the system does not contact human beings and thus does not require humidity regulation.

Each window 16 also has an automatic shade 35 disposed between the window panes 28 and 29 for restricting the passage of sunlight into the interior of the structure, as well as the outflow of heat therefrom in the winter months. These shades are preferably translucent and white or eggshell in color so that some light but little sun radiation passes therethrough. Each shade 35 is mounted on a roller 36 and the side edges of the shade may ride in the vertical grooves (not shown) formed in the side members 25 and 37 of the windows 16. The leading edge 40 of the shade or blind 35 may be weighted and contacts the sill 42 when the blind is fully extended so that it completely closes the associated window. In this closed position, the air flows between the inner glass 29 and the blind 35 so that the temperature adjacent the inner window is closely controlled.

The window structure and its automatic blind operating mechanism are disclosed in my U.S. Patent No. 3,247,894, issued Apr. 26, 1966, Ser. No. 372,165, and my copending U.S. application Ser. No. 531,973, filed Mar. 4, 1966, now Patent No. 3,288,206, issued Nov. 29, 1966.

The raising and lowering of the shades 35 is actuated in response to the sunlight passing through the windows 16 by the sensing device 45 mounted on the roof 15 of the building so that the sun rays are received at the same intensity and at the same angle as does the entire building. The sensing device is fully disclosed in the aforesaid copending application. Because the sensing device 45 separately senses the heat and radiation on four sides, the shades 35 in the windows are provided in more than one wall of the building so that the windows on each side may be controlled separately.

The perimeter system also negates the heat flow through the side wall 12 which has no windows therein. Accordingly, air from the heat exchanger unit 20 passes through the duct 47 and the short tubular connecting sections 48 and into the cavities 50 (FIG. 4) between adjacent wall studs 51. The air flows downwardly through these cavities and then through openings 51a (FIG. 1) at ground level into adjacent stud cavities 51b and then upwardly therebetween and into the joist plenum. From there air is then returned to the inlet of the heat exchanger unit 20. Thus the flow of heat through the wall 12 is substantially prohibited since air is circulated through the entire wall to maintain a constant temperature therein at all times regardless of the outside temperature.

The heat exchanger for the perimeter system is shown in FIG. 7 and includes a housing 52 having the heat exchange coil 53 mounted therein. Air is returned to this system through the joist plenum 33 from where it passes down through the duct 54 past the turning vanes 55 and into the housing 52. The air then flows over the coils 53 which are cooled by passing well water therethrough. This well water is drawn from the well 56 in the ground 57 through the pipe 58 by the pump 59, and after passing through the heat exchange coil, is returned to the ground through the pipe 61 so that it is not wasted.

After the air passes over the coil 53, it flows through the conventional filter 64 and is forced into the ducts 22 and 47 and 47a by the fan 63 which may be of the centrifugal blower type. A gas heater 65 may be provided for use in the winter time to maintain the outlet temperature of this heat exchanger at a temperature that will balance the load. Suitable electrical controls including a thermostat are provided to control the volume of well water flowing into the coil 53 and to regulate the heat output of the gas heater 65, as required to maintain the return air at a preset temperature.

In operation of the perimeter system, the heat exchange unit 20 continually circulates air at a predetermined temperature through the perimeter ducts 22 and 47. The air flows from the cavities 24 between the windows 16 and upwardly through each of the windows in the manner already described, and then into the joist plenum 33 which acts as a collection chamber, thereby restricting the flow of heat through the windows 16 and the roof 15. Similarly, this air flows from the duct 47 downwardly through the stud cavities 50 and then upwardly through the adjacent cavities 55 to the joist plenum 33 top revent the passage of heat through the wall 12. The air in the joist plenum 33 is drawn back into the unit 20, and this operation is continuous. In this manner, the flow of heat into or from the structure 10 through the walls, ceiling, and windows is substantially negated so that the only consideration in heating or cooling the interior thereof is the heat generated by the presence of human beings and by the lights in the structure.

When the temperature within the sensing device 45 is lowered, for example, when the sun is hidden by clouds or the like, the control system causes the shades 35 to be raised automatically. Likewise when the sun is shining through the windows 16, the sensing device 45 will cause the shades 35 to be lowered to block the flow of sunlight into the building 10. A manual over-ride switch may be provided for the control system so that the shade can be manually raised or lowered at any time, if desired. A suitable 24-hour timer may be provided to cause the shades to be lowered when temperature is below a certain preset value and/or during the time that the building occupants do not desire vision through the windows, thus reducing heat loss through the windows.

*Light system*

A second or light plenum chamber 70 is formed at the top of the room 71, as shown in FIGS. 1 and 2. The intermediate ceiling 34 encloses the metal frame members 73 and 74 having suitable sheeting 74a supported on bottom thereof. This sheeting may be fireproof sheetrock to comply with fire regulations, although it may be of other materials so long as it separates the joist and light plenums. A plurality of fluorescent lights 75 are mounted on the lower surface 76 of the intermediate ceiling 35 to provide light as required throughout the room.

The lower surface of the light plenum 70 is defined by the suspended ceiling 77. This ceiling is composed of conventional T-members 78 which define square or rectangular openings therebetween with the translucent panels 79 mounted therein and supported in the horizontal flanges 81 of the T-members in the conventional manner. Thus the light generated by the fluorescent tubes 75 is diffused by these translucent panels 79 so that the entire ceiling appears to be a source of light.

A separate source of conditioned air including the heat exchange unit 84 is provided for the light system, and supplies air at a predetermined temperature through the plurality of ducts 86 which are connected to the light plenum through the short ducts 87, as shown in FIGS. 1 through 4. Thus, preconditioned air is supplied to the light plenum 70 at all times from the heat exchanger unit (FIG. 4) which obtains its inlet air also from this plenum so that this system also is closed and no humidity controls are necessary. The heat exchange unit 84 is similar in design to the unit 20 described above except the gas heater 65 is not used, and thus no specific description thereof is made. Suffice to say, that the air is cooled by well water so that air at a control temperature is supplied to the ducts 86. However, the cooling effect of the heat exchange unit may be varied to permit the lights 75 to heat the room 71, as described below.

The fluorescent light tubes 5 generate a substantial amount of light as is well known together with a certain amount of heat. A large percentage of the energy dissipated by the tube is in the form of infrared rays which are absorbed in the fixtures, tubes, and the ceiling whereas the remaining energy appears as visible light rays which produce heat in the light plenum 70 or in the room below. Accordingly, the preconditioned air flowing through the light plenum 70 is designed to absorb the heat in the light plenum so that it has no effect on the room.

An importanc feature of this invention is the control of the pump 90 of the unit 84 so that when the temperature in the room 71 falls below a certain preset level, the thermostat 91 and its associated electrical controls terminate operation of pump 90 or valve so that the lights 75 apply heat to the room 71. When the desired temperature is reached, the thermostat allows the pump 90 to again force well water through the unit 84 to cool the plenum chamber 70 as described. The thermostat may also inactivate the fan of the unit 84 when heating is desired. It is thus required that the lights 75 be energized at all times for the system to operate effectively, and this has been found not to be objectionable and may extend the useful life of the lights since they are not turned on and off.

It is within the scope of the invention to combine the joist and light plenums 33 and 70 so that together they accomplish the opertaion as set forth above. Thus the light plenum would include each of the various conduits as well as the return air for the perimeter system. Moreover, it is possible to provide ducts at the base of each of the walls so that supply of air to the perimeter system is not required to flow downwardly through one cavity and then upwardly through adjacent cavities. Instead, the air would flow from the supply duct upwardly to the return air plenum. This would be particularly siutable for a multi-story building for which the present invention could be easily modified. Similarly, the plenums 33 and 70 could be prefabricated as light fixtures or modules which are merely assembled in place during construction or remodeling of the building.

*Interior system*

The interior system is similar to that disclosed in my aforesaid Patent No. 3,247,894, and functions to supply a certain volume of air at predetermined temperature and humidity to the interior rooms of the structure 10. This air preferably includes a certain amount of fresh air at all times in order to eliminate stale air from the system, and this fresh air must have its temperature and humidity regulated to achieve constant volume and constant temperature of the air. Since the heating is applied to the structure by the fluorescent lights, it will be seen that the light and interior systems are intimately dovetailed in their operation.

The interior system includes a central heat exchange unit 90 (FIG. 8) having an inlet duct 91 connected to the outside air through the wall and a second inlet duct 92 connected to the interior of the room through the grill 93 and connected to the heat exchange unit downstream of the heat exchange 95 and dehumidifying coils 96. The heat exchange coils 95 are mounted in the path of the fresh air inlet, and have well water at about 55° F. circulated therethrough by the pump 98 having the inlet and outlet pipes 99 and 101 leading to the well 56 so that it cools the air above 55° and heats the air which has an inlet temperature below 55°. If well water is not available a chiller can be used to provide tap water at 55° F.

The dampers 105 in the inlet passage 91 control the amount of outside air to the unit 90 and this is generally between 50% and 100% fresh outside air. This damper is controlled automatically by the motor 107 and the controls similarly position the damper 108 in the duct 92 which supplies return air to the unit 90. Thus when the system calls for 100% outside air, for example, when the outside humidity is low and the outside temperature close to that desired to be delivered to the room 71 at 65°, the controls for the unit 90 draw 100% fresh air with the dampers 105 open to the fullest extent while the return air damper 108 is closed. When the damper 108 is closed, the return air is exhausted to the atmosphere through the pressure actuated valve 110 which opens automatically, and can be linked to the damper 108.

After the air passes from the humidification chamber 103, it flows through the dehumidification coil 96 and the dampers 113 and into the mixing chamber 114 wherein it is mixed with the return air. When the humidity is above that desired, the dampers 113 are closed, the sprays 102 inactivated, and the dehumidification coil 96 activated to the extent necessary to remove moisture from the air.

From the mixing chamber the air passes through the filters 115, which are conventional in design and can be easily removed and cleaned. The air subsequently is drawn into the fan 116, which may be of the centrifugal blower type, and forced into the ducts 120 leading to the interior of the room 71.

The ducts 120 are located within the joist plenum 33 and have a plurality of outlet assemblies 122 (FIG. 2) which are evenly spaced throughout the room, as shown in FIG. 4. These outlet assemblies 122 include the downwardly extending section 123 which passes through the intermediate ceiling 34 in an air tight relationship therewith, and terminates in the outlet grill 125 coplanar with the ceiling 77. A suitably designed ceiling member 126 surrounds this outlet so that a pleasing appearance is presented and the light chamber 70 is maintained substantially sealed from the interior of the room 71.

In operation of the interior system, the air flows into the heat exchange unit 90 through the inlet duct 91 as regulated by the position of the dampers 105. The air then flows through the coil 95 having well water pumped therethrough at approximately 55° F. The air is thus heated or cooled to approximately 55° F. depending on the temperature of the inlet air. If additional humidity is required, the sprays (not shown) or the like could be used to supply moisture, or if humidity is to be removed, the damper 113 is closed and the coil 96 energized. Then the air flows into the mixing chamber wherein a preselected amount of return air is mixed therewith to attain the desired temperature, for example, 75° F. return air is mixed with 50 to 550° fresh air to produce a 65° F. supply to the ducts 120.

Thus the interior system is cooled at all times to a present temperature, usually 65° F. If the heat generated by the people within the space is not sufficient to raise the temperature to the desired level, for example 74° F., the light system automatically reduces the cooling within the light plenum 70, so that the lights 75 heat the interior 71 of the building and raise the temperature to the desired level. Since the perimeter system prohibits the flow of heat through the walls of the structure, the light system can be easily controlled to regulate the necessary heating of interior 71 of the building. In addition, the interior system supplies properly conditioned air which contains a maximum of fresh air. If the temperature within the space 71 rises above a certain level, e.g., 74° F., the light plenum is again cooled so that the 65° F. air supplied by the interior again cools the interior 71. At all times, a constant temperature and constant volume of air is supplied directly to the room occupants for maximum comfort.

Another embodiment of the heat exchange unit 90 is shown in FIGS. 9 and 10 wherein the primary heat exchange coil 95 has been separated into two distinct portions 95a and 95b. When 100% of outside air is called for in dry weather, the dampers 130, 131 and 132 will open and restriction to air flow reduced since air flows both through the passage 133 through coil 95a and through passage 134 through the coils 95b and 96a, as shown in FIG. 10. When dehumidification is called for, the dampers 130, 131, and 132 are closed and all of the air must then pass through each of the coils 95a, 95b, and 96a, and thus the dehumidification coil works sufficiently at its designed volume. Since there is restriction due to the coils 95b and 96a, the maximum outside air utilized in this condition is usually 50%.

If it is desired to utilize the system wherein a plurality of separate rooms are to be air conditioned as opposed to the single large room shown in FIG. 4, it is merely necessary to provide inlet and return air ducts to the interior heat exchange unit 90 to and from each of the rooms. In addition, each room would have a separate light plenum and the air to these separate plenums would be supplied through a bypass damper under the control of an individual room thermostat so that it could feed the cool air (65°) to the plenum, or bypass it to be returned to the heat exchange unit 90 when heat is required for the room.

The invention has thus provided an improved air conditioning system wherein separate systems are provided for controlling the heat load passing through the walls and ceiling of the structure, the heat generated within the structure by the lights, and the heat and humidity of the space which is utilized by human beings. Each of the systems uses well water (or a 55° chiller in lieu thereof) as the cooling media, and the lights are utilized to provide the necessary heat for the structure. The entire system therefor is inexpensive to operate. In addition, improvements in the heat exchange unit for the interior systems have been provided which eliminate the necessity of passing all of the fresh air through a dehumidification coil.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An air conditioning system for building having a plurality of walls and a roof, comprising a light system in the building including an upper wall, a translucent wall extending below said upper wall and spaced therefrom to define a closed light plenum, lights mounted in said plenum for lighting the space below said translucent wall, first heat exchange means for recirculating conditioned air at a controlled distribution pattern and temperature throughout said light plenum to absorb a controlled portion of the heat generated by said lights, a separate interior system including second heat exchange means for supplying air to the interior of said building with a controlled distribution pattern, temperature, humidity and volume, said interior system being separated from said light system so that there is no mixing of air between said systems, said air introduced into the interior of the building having a temperature below the temperature at which human beings are normally comfortable, and control means responsive to the temperature within the interior of the building to control the temperature of the air in said plenum.

2. An air conditioning system as defined in claim 1 wherein a perimeter system is provided for circulating conditioned perimeter air through the walls of said structure for negating the flow of heat therethrough.

3. An air conditioning system as defined in claim 2 wherein said perimeter system includes windows having parallel panes of glass between which said perimeter air flows, and a third heat exchange unit for producing said perimeter air at a controlled temperature.

4. An air conditioning system as defined in claim 3 wherein each of said heat exchange units uses well water as the primary heat transfer medium.

5. An air conditioning system as defined in claim 3 wherein a joist plenum is provided between the roof and said intermediate ceiling, said perimeter air flowing upwardly through said walls into said joist plenum for return to said third exchange unit.

6. An air conditioning system as defined in claim 2 wherein said perimeter system includes adjacent wall cavities, and adjacent cavities being connected so that said perimeter air flows through one of said cavities in a first direction and then through the adjacent cavities in the opposite direction.

7. An air conditioning system as defined in claim 1 wherein said second heat exchange unit includes a dehumidification coil, damper means for bypassing said dehumidification coil, and automatic control means for moving said damper means to bypass said dehumidification coil when the in let air is dry to reduce restriction to air flow.

8. An air conditioning system as defined in claim 5 wherein the output of said second heat exchange unit is connected to the interior of the building of ducts located in said joist plenum and having outlet assemblies which extend downwardly through said intermediate and translucent ceilings.

9. An air conditioning system is defined in claim 8 wherein said second heat exchange means supplies the air to said interior at a constant temperature and a constant volume.

References Cited

UNITED STATES PATENTS

| | | | |
|---|---|---|---|
| 2,167,878 | 8/1939 | Crawford | 165—45 |
| 2,364,220 | 12/1944 | Johnson | 165—49 |
| 3,090,434 | 5/1963 | Benson et al. | 165—50 |
| 3,103,156 | 9/1963 | Quin | 98—40 |

ROBERT A. O'LEARY, *Primary Examiner.*

CHARLES SUKALO, *Assistant Examiner.*

UNITED STATES PATENT OFFICE
CERTIFICATE OF CORRECTION

Patent No. 3,366,165                                         January 30, 1968

Charles F. Beeler

It is hereby certified that error appears in the above numbered patent requiring correction and that the said Letters Patent should read as corrected below.

Column 2, line 55, for "peopie" read -- people --; lines 71 and 72, for "collector" read -- collection --; column 4, line 16, for "top revent" read -- to prevent --; line 64, for "through 4." read -- and 4. --; column 5, line 1, for "5" read -- 75 --; line 4, for "tube" read -- tubes --; line 11, for "importane" read -- important --; column 6, line 58, for "of interior" read -- of the interior --; column 7, line 39, for "for building" read -- for a building --; column 8, line 24, for "and adjacent" read -- said adjacent --; line 33, for "in let" read -- inlet --; line 37, for "of ducts" read -- by ducts --.

Signed and sealed this 1st day of April 1969.

(SEAL)
Attest:

EDWARD M. FLETCHER, JR.                            EDWARD J. BRENNER
Attesting Officer                                       Commissioner of Patents